UNITED STATES PATENT OFFICE.

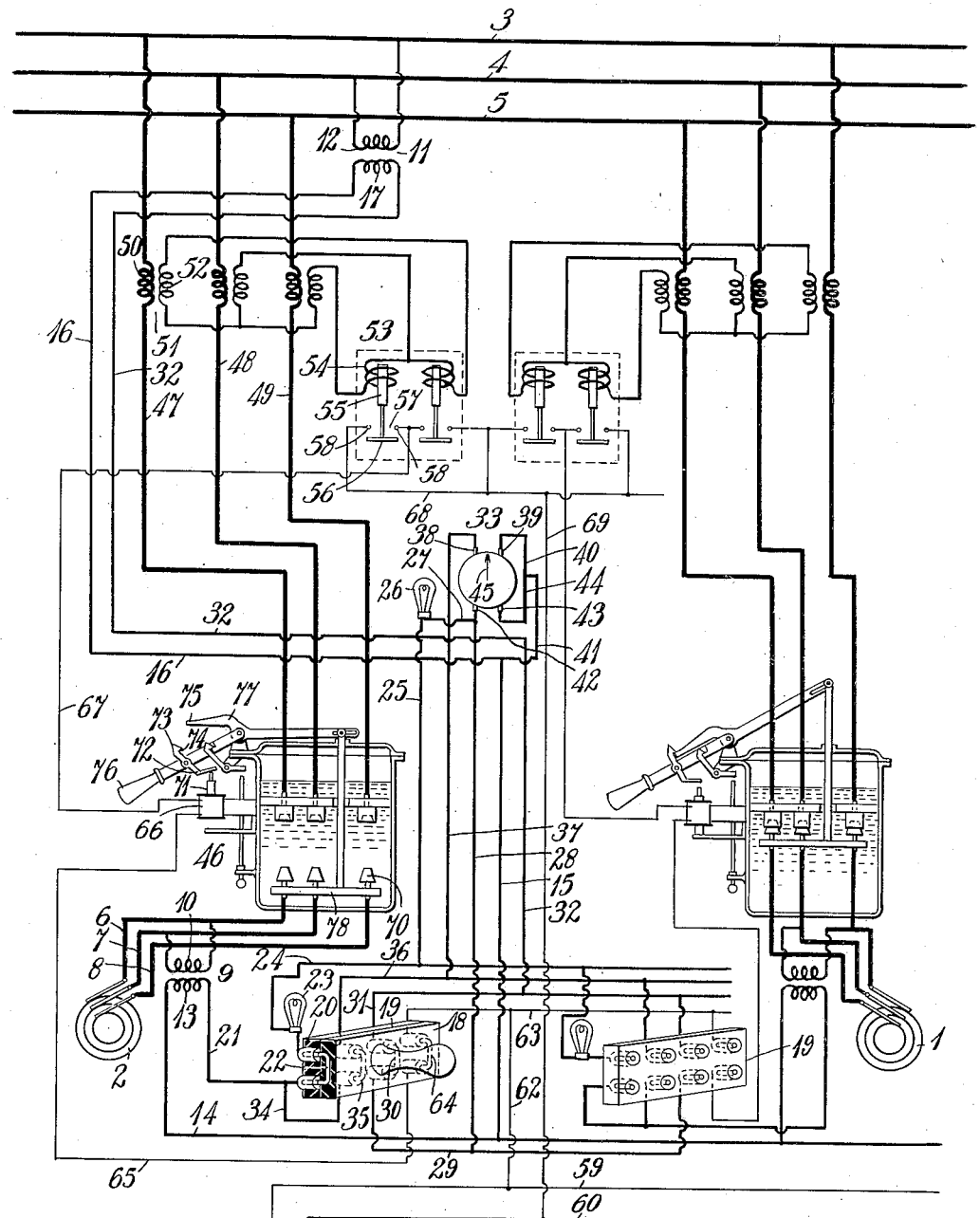

BERTRAND P. ROWE, OF WILKINSBURG, PENNSYLVANIA, ASSIGNOR TO WESTINGHOUSE ELECTRIC AND MANUFACTURING COMPANY, A CORPORATION OF PENNSYLVANIA.

SYNCHRONIZING SYSTEM.

1,138,689.  Specification of Letters Patent.  Patented May 11, 1915.

Application filed June 24, 1913. Serial No. 775,503.

*To all whom it may concern:*

Be it known that I, BERTRAND P. ROWE, a citizen of the United States, and a resident of Wilkinsburg, in the county of Allegheny and State of Pennsylvania, have invented a new and useful Improvement in Synchronizing Systems, of which the following is a specification.

My invention relates to synchronous alternating current electrical machines and it has special reference to means for controlling the operation of such machines when connected in parallel.

The object of my invention is to provide a control system that shall be simple in arrangement and that shall obviate the possibility of connecting a synchronous machine for parallel operation with other machines until the proper electrical conditions for synchronizing are attained.

In electrical power generating stations, a number of generators are usually available for supplying power to the same bus-bars from which the load circuits receive their energy. During the demands for power of relatively small amounts, only a few machines are connected to the bus bars. As the load upon the station increases, additional generators are connected to the bus bars to supply the increasing demands for power.

Before a synchronous generator can be successfully connected to the bus bars for parallel operation with other such machines, proper electrical conditions for synchronizing must be obtained upon the incoming machine. A failure to secure these conditions will result in the development of abnormal electrical disturbances in the related circuits which may cause either the destruction of apparatus, or, in the event of protective devices being inserted in the disturbed circuits, an interruption of service. Because it is of the first importance to maintain service at all times, it is highly desirable to insure against the interruption of such service by connecting an unsynchronized generator to the bus bars.

My invention automatically prevents the connecting of a generator to bus bars which are being supplied from other sources of power unless the said generator is in such condition as to cause no abnormal electrical disturbances in the circuit when the connection to the bus bars is effected.

The single figure of the accompanying drawing is a diagrammatic view of a system in which synchronous generators are arranged for supplying energy to bus bars which, in turn, supply energy to load circuits.

The connections for determining when the generators are properly synchronized and for connecting them to the bus bars when the proper conditions for synchronizing obtain, are made in accordance with my invention.

My invention may be applied to any number of synchronous generators which are connected to the aforesaid group of bus bars and which require protection when synchronizing and subsequently connecting them to the said bus bars.

Referring to the drawing, synchronous generators 1 and 2 are arranged for supplying three-phase currents to bus bars 3, 4 and 5. The generator 1 is shown connected to the said bus bars. It is proposed to synchronize the generator 2 with the bus bars and, when the proper electrical conditions obtain, to connect the generator 2 so as to operate in parallel with the generator 1. I have assumed that the generator 2 has been previously "phased out"; that is, when the voltage of a pair of leads, such as 6 and 7 of generator 2, is in phase with the voltage of the corresponding pair of bus bars 3 and 4, all the voltages of the pairs of generator leads, namely, 6, 7 and 8, are in phase with the voltages of the corresponding pairs of bus bars, namely, 3, 4 and 5.

In order to synchronize the generator 2 with the bus bars 3, 4 and 5, it is essential that the electromotive forces of the incoming generator 2 and of the said bus bars shall be approximately equal at every instant. This requires that the current frequencies be the same; that the voltages, as measured by a voltmeter, be equal, and that the voltages be in phase. It is necessary that these conditions obtain in each phase. If not fulfilled, an interchange of large-capacity currents between the generator 2 and the bus bars may lead to disastrous results and to the interruption of service, unless means in the system, such as an embodiment of my invention, is provided which obviates the possibility of connecting the generator 2 to the bus bars unless the above-mentioned synchronizing conditions have been attained.

In order to effect the adjustments of speed and voltages of the generator 2 for synchronizing the same with the bus bars 3, 4 and 5, I provide a voltage transformer 9, the primary winding 10 of which is connected to conductors 6 and 7 of the said generator, and a voltage transformer 11, the primary winding 12 of which is connected to the bus bars 3 and 4 corresponding to the said generator conductors. One terminal of the secondary winding 13 of the transformer 9 is connected, by means of conductors 14, 15 and 16, to a corresponding terminal of the secondary winding 17 of the transformer 11. When a plug 18 of the synchronizing switch 19 engages a receptacle 20, substantially as shown, the other terminals of the secondary windings 13 and 17 of the transformers 9 and 11, respectively, are connected in a circuit, which permits current to flow from the secondary winding 13, along a conductor 21, over an auxiliary switch 22, through an incandescent lamp 23, along a branch conductor 24 and a conductor 25, through an incandescent lamp 26, along conductors 27 and 28 to a branch conductor 29, through an auxiliary switch 30 of the synchronizing switch 19, to a branch conductor 31, and from thence to a conductor 32 which completes the circuit through the secondary winding 17 of the transformer 11. The lamps 23 and 26 are thus connected electrically in series between corresponding terminals of the secondary transformer windings 13 and 17. While synchronizing, as the electromotive forces of the windings 13 and 17 change from the condition of phase coincident to that of phase opposition, the flow of current through the lamps will vary from a minimum to a maximum value. When the electromotive forces induced in the windings 13 and 17 are exactly equal and opposite in phase, the current through the lamps is zero. When the lamps burn at a maximum brilliancy, the voltages induced in the secondary windings are in exact opposition. The rate of the pulsation from complete darkness to maximum brilliancy of the lamps depends upon the relative current frequencies of the incoming generator 2 and the bus bars 3, 4 and 5. By adjusting the speed and the voltage of the generator 2, this pulsation can be generally reduced to as low a rate as desired, before throwing the generator 2 upon the bus bars.

The lamps 23 and 26, when used for the purpose explained above, afford no positive means of determining whether the incoming generator 2 is fast or slow, or whether, in raising the speed of the said generator, the synchronous speed has been passed. By means of the said lamps, it is impossible to determine the exact phase difference between the voltages of the incoming generator 2 and of the bus bars, and it is impossible to determine the exact time, during the dark period of the lamps, at which the voltages are substantially in phase. Because of these uncertainties, I provide my system with a synchroscope 33 so arranged that it may be used with any number of synchronous generators, such as generators 1 and 2, which are to be connected to the bus bars 3, 4 and 5 for parallel operation.

When the synchronizing switch 19 is closed, the synchroscope 33, which may be of any standard type, is connected to the transformer windings 13 and 17 substantially as described below. Current flows from the winding 13, along conductors 21 and 34, over an auxiliary switch 35, along conductors 36 and 37, to a binding post 38 of the synchroscope 33, through a stationary coil (not shown) in said synchroscope, to a binding post 39, along conductors 40, 41 and 15, to the said winding 13. The transformer winding 17 supplies current which flows along conductors 32 and 31, over the auxiliary switch 30, along conductors 29 and 28, to a binding post 42, through a coil (not shown) of the synchroscope 33, to a binding post 43, along conductors 44, 41 and 16 to the transformer winding 17. By means of an indicator 45 rotating over a dial upon the synchroscope, the operator can determine whether the incoming generator 2 is running too fast or too slow, what the difference is in the speed of the said incoming generator and that of the generator 1, and the exact instant when the two said generators are in synchronism.

In order to eliminate the fallible judgment of the operator as to the proper instant for throwing the generator 2 upon the bus bars 3, 4 and 5, I have provided, in my system, means which automatically prevents the connecting of the said generator to the bus bars when improper synchronizing conditions exist which would cause abnormal and destructive electrical disturbances in the circuit if said connection were made.

The generator 2 may be thrown upon the bus bars 3, 4 and 5 at the proper instant by closing an oil switch 46 which connects generator leads 6, 7 and 8, respectively, to bus bar leads 47—48 and 49. Inserted in each of said bus bar leads is a primary winding 50 of a current transformer 51, secondary windings 52 of which are connected in Y. Overload relays 53, coils 54 of which are shown connected in open delta to the transformer secondary windings 52, are provided with magnetizable plungers 55. Mounted upon each of the said plungers is a member 56 which is adapted to bridge a gap 57 extending between electrical contacts 58, when said plunger is attracted by the magnetizing coil 54. Thus, the members 56 close an electrical circuit which receives its excitation from bus bars 59 and 60, here shown as being furnished with direct current energy supplied from an exciter 61. Current will flow from the bus bar 59, along conductor 62 and a branch conductor 63, over an auxiliary switch 64 of the synchronizing switch 19, along conductor 65, through the winding of a trip coil 66 which is mounted upon the oil switch 46, along a conductor 67, contact points 58, bridging members 56, conductors 68 and 69, back to the bus bar 60 of the generator 61.

When the operator attempts to close the oil switch 46, and thereby throws the generator 2 upon the bus bars 3, 4 and 5 with which the generator has previously not been properly synchronized, the instant that electrical connection is made between the generator leads 6, 7 and 8 and the respective bus bar leads 47, 48 and 49 by means of members 70 of the oil switch, an abnormal flow of current passes through the primary windings 50 of the current transformer 51. The consequent abnormal currents being induced in the secondary windings 52 of said transformers cause the plungers 55 of the overload relays 53 to become operative, thereby closing the circuit through the exciting winding of the trip coil 66. As a plunger 71 of the said trip coil is drawn upwardly, it engages an arm of a pivoted lever 72, the other arm of which is provided with a toothed portion 73. As the lever 72 is struck a blow by the plunger 71, the portion 73 is released from engagement with its coöperative and recessed portions 74 and 75 formed upon a lifting handle 76 and a switch handle 77, respectively. A member 78, upon which the contact-making members 70 of the oil switch are mounted, then disconnects the generator leads from the bus bar leads. The operator may retain his hold upon the lifting handle 76, but the switch handle 77, having been released therefrom, will protect the generator 2 and the bus bar circuit from the abnormal electrical disturbances which would result from connecting the said generator to said bus bar circuit when improper conditions for synchronizing exist. The oil switch 46 will take a position substantially similar to that shown by the switch associated with the generator 2.

It is evident from the foregoing description that the oil switches 46 may be released automatically to disconnect their associated generators from the bus bars only when the synchronizing plug 18 is inserted in the receptacle 20. After the generator 2 has been successfully connected to operate in parallel with the bus bars, the plug 18 is removed, which obviates the possibility of automatically opening the oil switch 46 because of the overloads demanding excess power from the said generator.

While I have herein described in detail one embodiment of my invention, it is not intended that my invention be limited to the specific arrangement and circuit connections disclosed, and I desire that all variations in systems which do not depart from the spirit of my invention, shall be included within its scope.

I claim as my invention:

1. The combination with a power circuit, an alternating current dynamo-electric machine, a main switch adapted to connect said machine to said circuit, and electro-responsive means which may prevent the permanent closing of the main switch, of a main control circuit for said electro-responsive means which is provided with auxiliary switches, a synchronizing circuit, a multipolar switch adapted to close simultaneously the main control and the synchronizing circuits, and an auxiliary control circuit provided with overload relays to actuate said auxiliary switches in the main control circuit.

2. The combination with a power circuit, an alternating current dynamo-electric machine, a main switch adapted to connect the machine to said circuit, and electro-responsive means to prevent the permanent closing of the main switch when the current flow from said dynamo-electric machine exceeds a certain amount, of a main control circuit comprising an overload relay and said electro-responsive means, a synchronizing circuit, a multi-polar switch adapted to close simultaneously the main control and the synchronizing circuits, and an auxiliary control circuit to actuate said overload relay, said auxiliary control circuit comprising current transformers connected to the mains of said dynamo-electric machine.

3. The combination with a power circuit, an alternating current dynamo-electric machine, a main switch adapted to connect said machine to the power circuit, and electro-responsive means to prevent the permanent closing of the main switch, of a main control circuit for said electro-responsive means comprising an overload relay, a synchronizing circuit, a multi-polar switch to close said main control circuit during the time only that the synchronizing circuit is closed, and an auxiliary control circuit to actuate said overload relay when the current flow from said dynamo-electric machine exceeds a certain amount.

In testimony whereof, I have hereunto subscribed my name this 17th day of June, 1913.

BERTRAND P. ROWE.

Witnesses:
B. B. HINES,
M. C. MERZ.